US012612169B2

(12) United States Patent
Escoffier et al.

(10) Patent No.: US 12,612,169 B2
(45) Date of Patent: Apr. 28, 2026

(54) PROPULSION UNIT COMPRISING A TRANSMISSION SYSTEM, SEVERAL ELECTRIC MOTORS AND AT LEAST ONE REMOTE COUPLING SYSTEM, AIRCRAFT COMPRISING AT LEAST ONE SUCH PROPULSION UNIT

(71) Applicant: Airbus SAS, Blagnac (FR)

(72) Inventors: Adrien Escoffier, Marignane (FR); Jean-Victor Lapeyre, Marignane (FR); Georges Devilliers, Marignane (FR); Antoine Philippe, Marignane (FR)

(73) Assignee: Airbus SAS, Blagnac (FR)

( * ) Notice: Subject to any disclaimer, the term of this patent is extended or adjusted under 35 U.S.C. 154(b) by 216 days.

(21) Appl. No.: 18/464,869

(22) Filed: Sep. 11, 2023

(65) Prior Publication Data

US 2024/0083590 A1 Mar. 14, 2024

(30) Foreign Application Priority Data

Sep. 13, 2022 (FR) ...................................... 2209151

(51) Int. Cl.
| | |
|---|---|
| *B64D 27/24* | (2024.01) |
| *B64D 35/08* | (2025.01) |
| *H02K 7/00* | (2006.01) |
| *H02K 7/116* | (2006.01) |

(52) U.S. Cl.
CPC ............. *B64D 27/24* (2013.01); *B64D 35/08* (2013.01); *H02K 7/003* (2013.01); *H02K 7/116* (2013.01)

(58) Field of Classification Search
CPC ........ H02K 7/003; H02K 7/116; B64D 27/24; B64D 35/08
See application file for complete search history.

(56) References Cited

U.S. PATENT DOCUMENTS

| | | | |
|---|---|---|---|
| 10,418,868 B1* | 9/2019 | Long ................... | B64C 29/0025 |
| 2019/0288571 A1* | 9/2019 | Lehikoinen ............. | H02K 3/28 |
| 2020/0381984 A1* | 12/2020 | Sercombe ............. | B64D 31/00 |

(Continued)

FOREIGN PATENT DOCUMENTS

CN 106953483 A 7/2017

OTHER PUBLICATIONS

French Search Report for corresponding French Patent Application No. 2209151 dated Mar. 29, 2023; priority document.

*Primary Examiner* — Alexander A Singh
*Assistant Examiner* — Charlie Frank Mann, Jr.
(74) *Attorney, Agent, or Firm* — Greer, Burns & Crain, Ltd.

(57) ABSTRACT

A propulsion assembly including a propulsion system, electric motors and a transmission system that is configured to couple the electric motors to the propulsion system, at least one of the electric motors including an output shaft located at a face facing away from the transmission system. Additionally, the propulsion assembly includes at least one coupling shaft connecting the output shaft of the electric motor to the transmission system, a first coupling system, which is able to switch over to the uncoupled state in the event of an incident at the electric motor and is configured to rotationally couple the first end of the coupling shaft to the output shaft of the electric motor, and a second coupling system, which is configured to rotationally couple the second end of the coupling shaft to the transmission system.

15 Claims, 3 Drawing Sheets

(56)            References Cited

U.S. PATENT DOCUMENTS

2021/0362862 A1    11/2021  Jaljal et al.
2021/0399607 A1*  12/2021  Beall ...................... B64D 27/34
2022/0274715 A1*   9/2022  Beall ...................... B64D 27/31

* cited by examiner

Fig. 6

PROPULSION UNIT COMPRISING A TRANSMISSION SYSTEM, SEVERAL ELECTRIC MOTORS AND AT LEAST ONE REMOTE COUPLING SYSTEM, AIRCRAFT COMPRISING AT LEAST ONE SUCH PROPULSION UNIT

CROSS-REFERENCES TO RELATED APPLICATIONS

This application claims the benefit of the French patent application No. 2209151 filed on Sep. 13, 2022, the entire disclosures of which are incorporated herein by way of reference.

FIELD OF THE INVENTION

The present application relates to a propulsion assembly comprising a transmission system, a plurality of electric motors and at least one separate coupling system, and to an aircraft comprising at least one such propulsion assembly.

BACKGROUND OF THE INVENTION

According to an embodiment that can be seen in FIG. 1, an aircraft 10 comprises a fuselage 12, at least one wing 14 connected to the fuselage 12, and propulsion assemblies 16 connected to the wing 14 and arranged on either side of the fuselage 12. As is shown in FIGS. 2 and 3, each propulsion assembly 16 comprises a propeller 18 that has an axis of rotation A18.

For the remainder of the description, a longitudinal direction is parallel to the axis of rotation A18 of the propeller 18. The concepts "front" and "rear" refer to the direction of flow of the air with respect to the aircraft in flight, the air flowing in the longitudinal direction, from the front to the rear.

An electric propulsion assembly comprises a plurality of electric motors 20 and a transmission system 22, such as a gearbox, for example, the transmission system being configured to couple the electric motors 20 to the propeller 18.

As is shown in FIG. 3, the transmission system 22 comprises a first casing 24, which has, in the longitudinal direction, a front wall F24 oriented toward the propeller 18 and a rear wall F24' to which the electric motors 20 are attached, and at least one drivetrain 26, which is located within the first casing 24 and has at least one input 28 for each electric motor 20 and one output 30, in the form of an output shaft, which passes through the front wall F24 in order to be coupled to the propeller 18.

Each electric motor 20 has a second casing 32, which comprises a bearing face F32 attached to the rear wall F24' of the first casing 24, and an output shaft 34, which protrudes with respect to the bearing face F32 and passes through the rear wall F24' of the first casing 24. This output shaft 34 is coupled to one of the inputs 28 of the drivetrain 26 of the transmission system 22 by way of a coupling system 36 located within the first casing 24 of the transmission system 22.

According to one embodiment, each coupling system 36 comprises a freewheel that is configured to assume a coupled state, in which the output shaft 34 of the corresponding electric motor 20 is rotationally coupled and transmits a rotational movement to the drivetrain 26 of the transmission system 22, and an uncoupled state, for example in the event of an incident, in which the output shaft 34 of the corresponding electric motor 20 is no longer coupled, and no longer transmits any rotational movement, to the drivetrain 26 of the transmission system 22.

As a result, if an electric motor 20 is no longer operating and the output shaft 34 thereof is prevented from rotating, the coupling system 36 makes it possible to isolate the output shaft from the drivetrain 26, which remains operational and transmits the rotational movements from the other electric motors 20 to the propeller 18.

The coupling systems 36 require more frequent maintenance operations than the other elements of the transmission system 22. For each maintenance operation, the transmission system 22 has to be detached, which entails removing the electric motors 20, and the casing 24 of the transmission system has to be opened in order to access the coupling systems 36. These various steps are relatively long, laborious and expensive.

The present invention aims to overcome all or some of the disadvantages of the prior art.

SUMMARY OF THE INVENTION

To this end, one subject of the invention is a propulsion assembly comprising a propulsion system, electric motors and a transmission system that is configured to couple the electric motors to the propulsion system, each electric motor comprising a first face oriented toward the transmission system, a second face facing away from the transmission system and an output shaft, the propulsion assembly comprising, for at least one electric motor, a first coupling system that is configured to assume a coupled state in which the output shaft of the electric motor is rotationally coupled to the transmission system and an uncoupled state in which the output shaft of the electric motor is not coupled to the transmission system.

According to the invention, the output shaft and the first coupling system are located at the second face of the second casing of the electric motor. Additionally, the propulsion assembly comprises at least one coupling shaft, which connects the output shaft of the electric motor to the transmission system, and has a first end that is intended to be rotationally coupled to the output shaft by way of the first coupling system and a second end that is rotationally coupled to the transmission system by way of a second coupling system.

Since the first coupling system is separate from the transmission system, it is no longer necessary to detach and remove the transmission system in order to carry out a maintenance operation on the first coupling system. The fact that the first coupling system is not situated within the transmission system also makes it possible to increase the time between two maintenance operations on the transmission system.

According to another advantage, the first coupling system is situated within a more accessible region, which makes it easier to perform maintenance and monitoring operations on the coupling system.

According to another feature, the output shaft is hollow and extends from the first face to the second face. Additionally, the coupling shaft is housed in the output shaft, which is hollow.

According to another feature, the first coupling system is located within the hollow output shaft.

According to another feature, since the output shaft has a free end that protrudes with respect to the second face, the first coupling system is located, within the output shaft, in the vicinity of the free end of the output shaft.

According to another feature, the propulsion assembly comprises a cover located at the free end of the output shaft and connected to the output shaft by way of a removable connection.

According to another feature, the coupling shaft is hollow.

According to another feature, the transmission system comprises a hole housing the second end of the coupling shaft. Additionally, the second coupling system comprises external splines located at the second end of the coupling shaft and internal splines located in the hole and configured to engage with the external splines.

According to another feature, the internal splines, which are secured to the transmission system, have mechanical properties that are superior to those of the external splines, which are secured to the coupling shaft.

According to another feature, the propulsion assembly comprises, for each electric motor, a coupling shaft and first and second coupling systems.

Another subject of the invention is an aircraft comprising at least one propulsion assembly according to one of the above features.

BRIEF DESCRIPTION OF THE DRAWINGS

Further features and advantages will become apparent from the following description of the invention, which description is given solely by way of example, with reference to the appended drawings in which:

FIG. 6 is a schematic cross section of electric motors of a propulsion assembly, illustrating another embodiment of the invention.

DETAILED DESCRIPTION OF THE PREFERRED EMBODIMENTS

Figure 1:
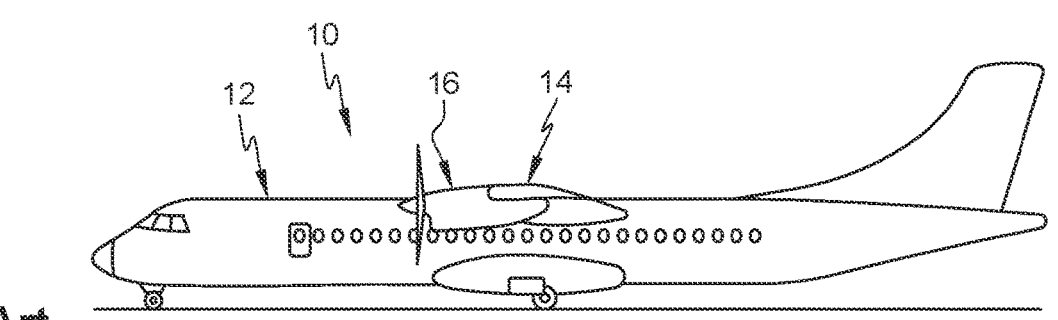
FIG. 1 is a side view of an aircraft.
Figure 2:
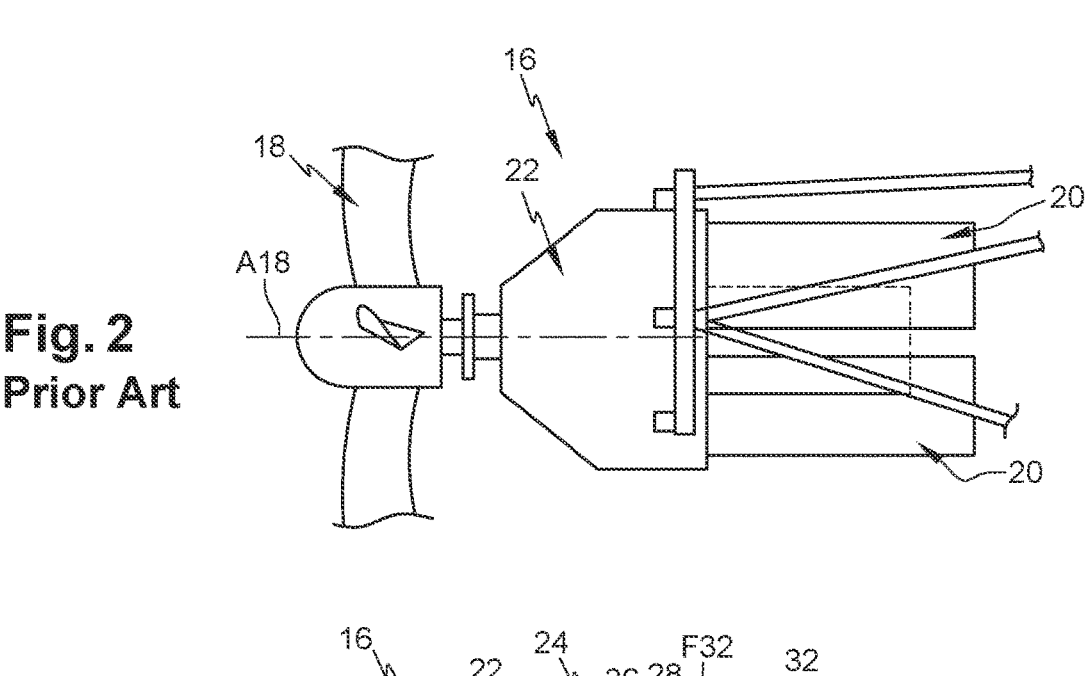
FIG. 2 is a schematic side view of an electric propulsion assembly, illustrating one embodiment of the prior art.
Figure 3:
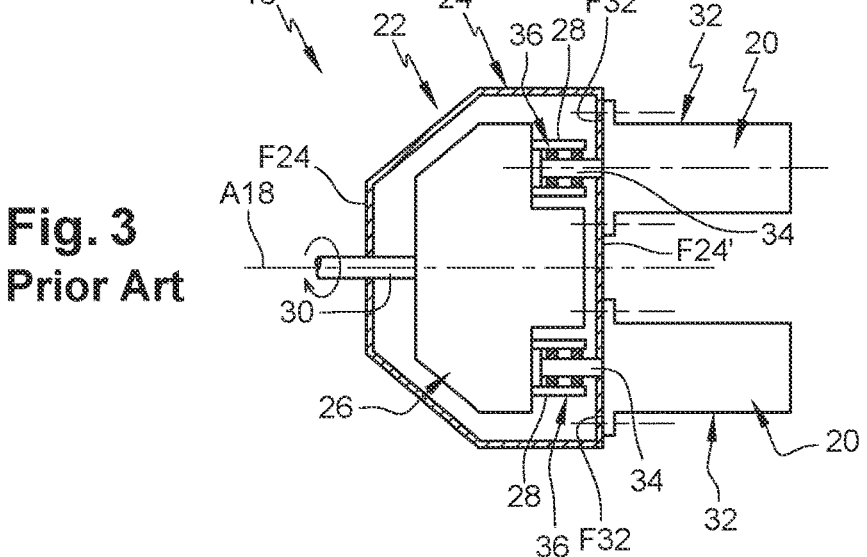
FIG. 3 is a schematic cross section of a transmission system and electric motors of a propulsion assembly, illustrating one embodiment of the prior art.
Figure 4:
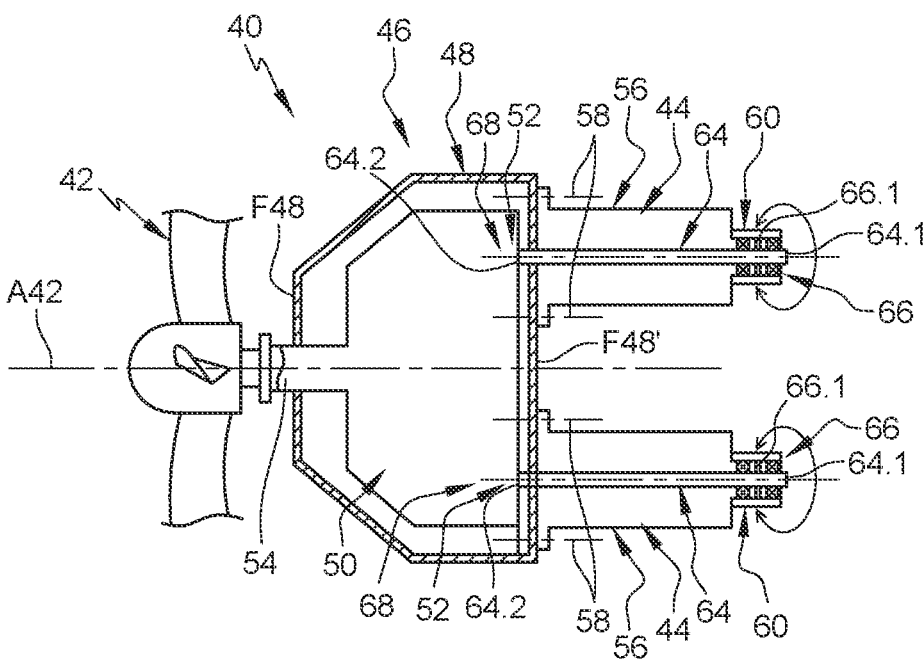
FIG. 4 is a schematic cross section of a transmission system and electric motors of a propulsion assembly, illustrating one embodiment of the invention.

According to one embodiment that can be seen in FIG. 4, an electric propulsion assembly 40 comprises a propeller 42 that has an axis of rotation A42, a plurality of electric motors 44 and a transmission system 46, such as a gearbox, for example, the transmission system being configured to couple the electric motors 44 to the propeller 42.

According to one application, an aircraft comprises at least one such propulsion assembly 40. Of course, the invention is not restricted to this application. Regardless of the application, the electric propulsion assembly 40 comprises a propulsion system, such as a propeller, for example, a plurality of electric motors 44 and a transmission system 46 that is configured to couple the electric motors 44 to the propulsion system.

According to one configuration that can be seen in FIG. 4, the transmission system 46 comprises a first casing 48, which has, in the longitudinal direction, a front wall F48 oriented toward the propulsion system and a rear wall F48' to which the electric motors 44 are attached, and at least one drivetrain 50, which is located within the first casing 48 and has at least one input 52 for each electric motor 44 and one output 54, in the form of an output shaft, which passes through the front wall F48 in order to be coupled to the propulsion system.

Each electric motor 44 comprises a second casing 56, which has a first face 56.1 oriented toward the transmission system 46 and a second face 56.2 facing away from the first face 56.1 and from the transmission system 46. The propulsion assembly 40 comprises, for each electric motor 44, connecting elements 58 that allow the electric motor 44 to be attached to the first casing 48 of the transmission system 46. By way of example, the connecting elements 58 are screws, which pass through lugs secured to the second casing 56 of the electric motor 44 and are each screwed into a tapped hole integral with the first casing 48 of the transmission system 46. Of course, the invention is not restricted to this embodiment for the connecting elements 58. Regardless of the embodiment, each electric motor 44 is connected to the transmission system 46 by way of a removable connection.

Each electric motor 44 comprises an output shaft 60, which has a pivot axis A60 and is connected to the second casing 56 by way of a pivoting connection 62.

According to one arrangement, the pivot axis A60 of the output shaft 60 is substantially parallel to the longitudinal direction. The first and second faces 56.1, 56.2 are substantially perpendicular to the pivot axis A60 and are offset with respect to one another in the longitudinal direction.

According to one configuration, the output shaft 60 extends from the first face 56.1 to the second face 56.2 and passes through the first and second faces 56.1, 56.2, the pivoting connection 62 comprising a first rotational guide 62.1, such as a rolling bearing, for example, which is interposed between a wall of the second casing 56 and the output shaft 60, the wall being situated at the first face 56.1, and a second rotational guide 62.2, such as a rolling bearing, for example, which is interposed between a wall of the second casing 56 and the output shaft 60, the wall being situated at the second face 56.2.

For at least one electric motor 44, the output shaft 60 is located at the second face 56.2, which faces away from the transmission system 46. According to one embodiment, each electric motor 44 connected to the transmission system 46 comprises an output shaft 60 located at the second face 56.2 of the second casing 56, which faces away from the transmission system 46.

For at least one of the electric motors 44 having an output shaft 60 located at the second face 56.2, the propulsion assembly 40 comprises:

at least one coupling shaft 64, which connects the output shaft 60 of the electric motor 44 to the transmission system 46, and has first and second ends 64.1, 64.2, a first coupling system 66, which is configured to rotationally couple the first end 64.1 of the coupling shaft 64 to the output shaft 60 of the electric motor 44, a second coupling system 68, which is configured to rotationally couple the second end 64.2 of the coupling shaft 64 to the transmission system 46.

According to one configuration, the propulsion assembly 40 comprises a coupling shaft 64 and first and second coupling systems 66, 68 for each electric motor 44.

The first coupling system 66 is configured to assume a coupled state, in which the output shaft 60 of the electric motor 44 is rotationally coupled and transmits a rotational movement to the transmission system 46 via the coupling shaft 64, and an uncoupled state, for example in the event of an incident, in which the output shaft 60 of the electric motor 44 is no longer coupled, and no longer transmits any rotational movement, to the coupling shaft 64 (and thus to the transmission system 46). The first coupling system 66 passes from the coupled state to the uncoupled state, for example in the event of an incident, as soon as a torque transmitted via the first coupling system 66 exceeds a given threshold or is no longer within a given range.

As a result, if the electric motor 20 coupled to the coupling shaft 64 by way of the first coupling system 66 is no longer operating and the output shaft 60 thereof is prevented from rotating, the first coupling system 66 makes it possible to isolate the output shaft from the coupling shaft 64 and thus from the transmission system 46, which remains operational and transmits the rotational movements from the other electric motors to the propulsion system.

Furthermore, since the first coupling system 66 is located outside of the transmission system 46, it is no longer necessary to detach and remove the transmission system 46 in order to carry out a maintenance operation on the first coupling system 66, which makes it possible to increase the time between two maintenance operations on the transmission system 46.

In order to obtain a more compact assembly, for at least one electric motor 44, the output shaft 60 is hollow and the coupling shaft 64 is housed in the hollow output shaft 60. According to one arrangement, the coupling shaft 64 and the output shaft 60 are coaxial.

According to one embodiment, the first coupling system 66 comprises a freewheel 66.1 that is configured to assume a rotationally coupled state, in which the hollow output shaft 60 of the electric motor 44 is rotationally coupled and transmits a rotational movement to the coupling shaft 64, and an uncoupled state, for example in the event of an incident, in which the hollow output shaft 60 of the electric motor 44 is no longer rotationally coupled, and no longer transmits any rotational movement, to the coupling shaft 64.

According to one configuration, the first coupling system 66 comprises first and second rotational guides 66.2, 66.3 located on either side of the freewheel 66.1. The latter comprises a ring having an internal surface that engages with the coupling shaft 64 and an external surface that engages with the output shaft 60, at least one of the internal and external surfaces being frictionally coupled to the coupling shaft 64 or the output shaft 60.

Since the freewheel 66.1 is situated outside of the first casing 48 of the transmission system 46, any dust generated by the frictional coupling of the freewheel 66.1 does not contaminate the interior of the transmission system 46, thereby limiting the risk of premature degradation of the components of the transmission system 46.

According to one arrangement, the first coupling system 66 is located inside, and thus protected by, the output shaft 60.

According to one configuration, the output shaft 60 has a free end 60.1 that protrudes with respect to the second face 56.2 and is remote from the second face 56.2. In addition, the first coupling system 66 is located, within the portion of the output shaft 60 that protrudes with respect to the second face 56.2, in the vicinity of the free end 60.1 of the output shaft. Thus, the first coupling system 66 can be accessed from the free end 60.1 of the output shaft 60 and it is not necessary to remove the electric motor 44 in order to carry out maintenance on, or to monitor, the first coupling system 66. Since the first coupling system 66 is located outside of the electric motor 44 and in the vicinity of the second face 56.2, which is a relatively accessible region, the maintenance or monitoring operations on the first coupling system 66 are simplified.

According to one embodiment, the propulsion assembly comprises a cover 70, which is located at the free end 60.1 of the output shaft 60, is connected to the output shaft 60 by way of a removable connection and is configured to close off the free end 60.1 of the output shaft 60. This embodiment makes it possible to reinforce the protection of the first coupling system 66.

According to one configuration, the coupling shaft 64 is hollow in order to decrease the mass thereof.

According to one embodiment, the second coupling system 68 is configured to connect the second end 64.2 of the coupling shaft 64 to one of the inputs 52 of the drivetrain 50 of the transmission system 46 that comprises a hole 72 that is configured to receive the second end 64.2 of the coupling shaft 64. According to one arrangement, the second coupling system 68 is located within the first casing 48.

According to one configuration, the second coupling system 68 comprises external splines 74 located at the second end 64.2 of the coupling shaft 64 and internal splines 76 located in the hole 72 and configured to engage with the external splines 74.

According to this configuration, the external and internal splines 74, 76 are configured to allow the coupling shaft 64 to be rotationally coupled to the transmission system 46. This embodiment allows the second end 64.2 of the coupling shaft 64 to be inserted into the hole 72 of the input 52 of the transmission system 46 by way of a translational movement.

Thus, the coupling shaft 64 and the freewheel 66.1 can be taken out from the free end 60.1 of the output shaft 60 without needing to remove the electric motor 44, which helps to simplify the maintenance or the monitoring of the freewheel 66.1 and the coupling shaft 64.

Of course, the invention is not restricted to this embodiment for the second coupling system 68. Preferably, the latter comprises a sliding connection, which is oriented in the longitudinal direction and allows the second end 64.2 of the coupling shaft 64 to be inserted into the hole 72 of the input 52 of the transmission system 46 by way of a translational movement, and a system for preventing the coupling shaft 64 from rotating about the pivot axis.

According to one configuration, the internal splines 76, which are secured to the transmission system 46, have mechanical properties that are superior to those of the external splines 74, which are secured to the coupling shaft 64. This configuration makes it possible to limit the risk of the internal splines 76 of the input 52 of the transmission system 46 being damaged, which helps to increase the time between two maintenance operations on the transmission system 46.

Figure 5:
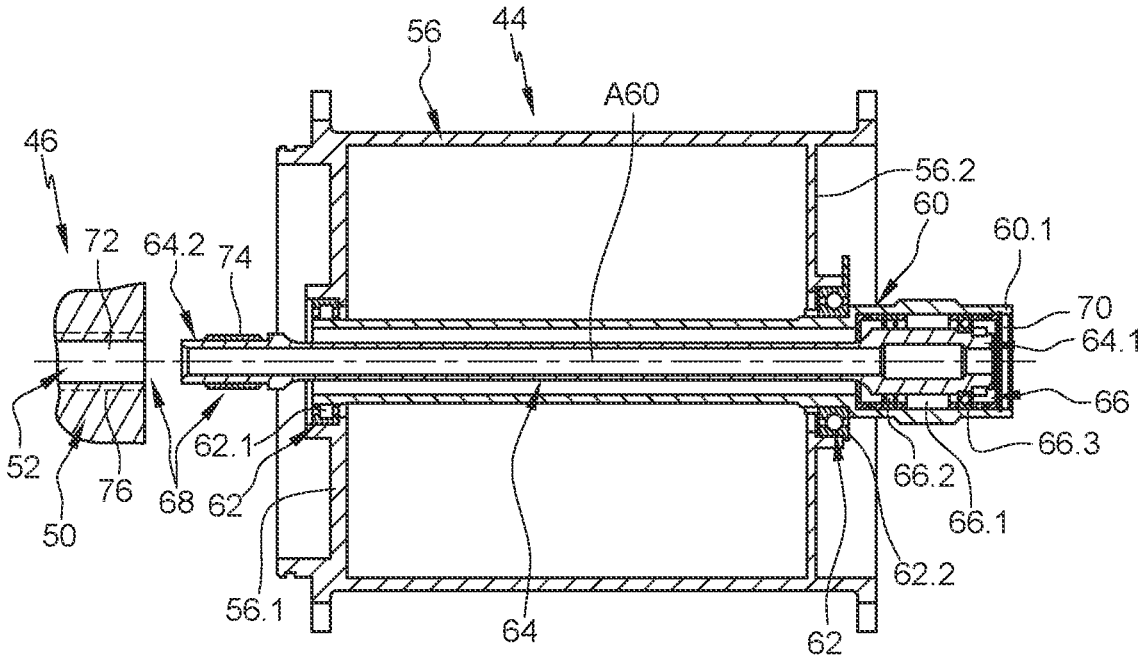
FIG. 5 is a schematic cross section of an electric motor of a propulsion assembly, illustrating one embodiment of the invention.
Figure 6:
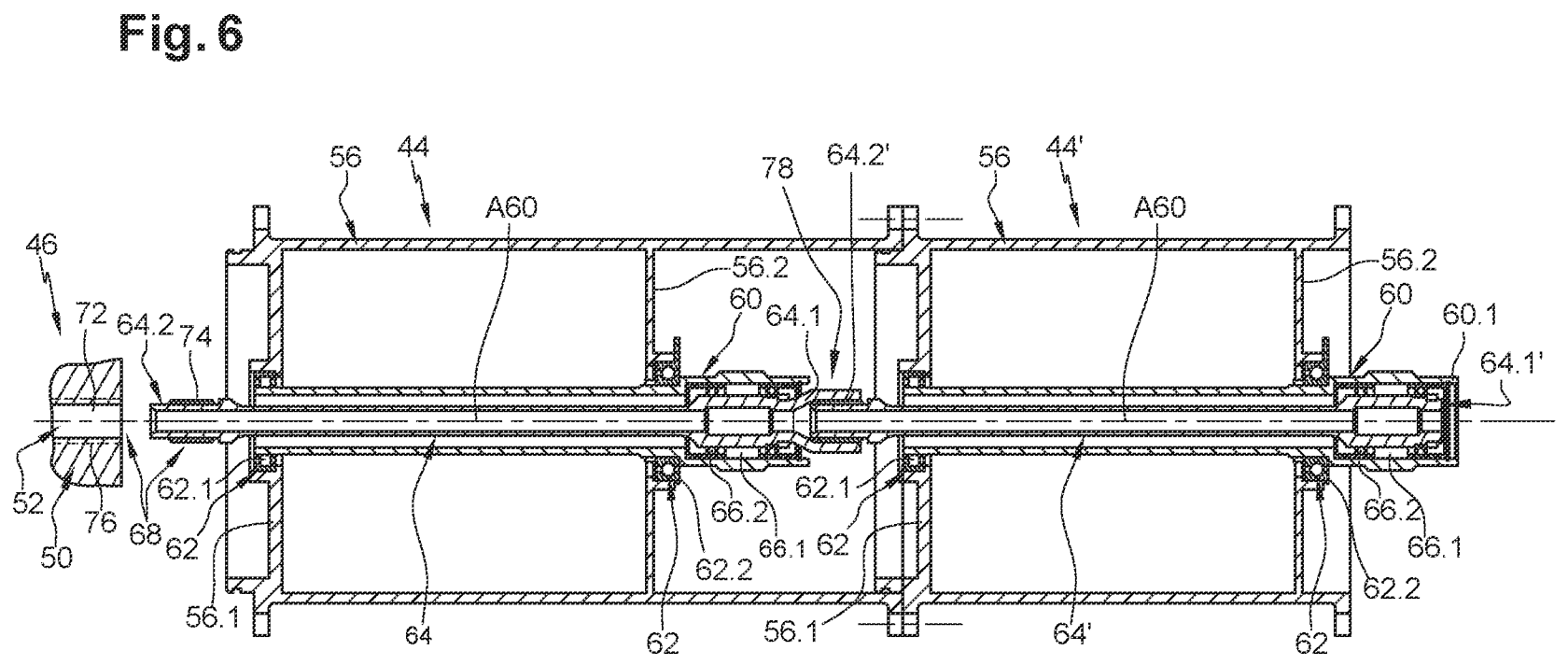

According to another embodiment that can be seen in FIG. 6, the propulsion assembly 40 comprises a plurality of electric motors 44, 44' that are coupled to the same input 52 of the transmission system 46. According to one configuration, the propulsion assembly 40 comprises first and second electric motors 44, 44', the first electric motor 44 being interposed between the second electric motor 44' and the transmission system 46. The first and second electric motors 44, 44' are substantially identical to the motor described in FIG. 5, the casings 56 of the electric motors 44, 44' being connected to one another.

For the first and second electric motors 44, 44', the propulsion assembly 40 comprises first and second coupling shafts 64, 64'.

The first coupling shaft 64 connects the output shaft 60 of the first electric motor 44 to the transmission system 46, the first end 64.1 of the first coupling shaft being configured to be able to be rotationally coupled to the output shaft 60 of the first electric motor 44 by way of a first coupling system 66, the second end 64.2 of the first coupling shaft being configured to be rotationally coupled to the transmission system 46 by way of a second coupling system 68.

The second coupling shaft 64' connects the output shaft 60 of the second electric motor 44' to the first coupling shaft 64 provided for the first electric motor 44, the first end 64.1' of the second coupling shaft being configured to be able to be rotationally coupled to the output shaft 60 of the second electric motor 44' by way of a first coupling system 66, the second end 64.2' of the second coupling shaft being configured to be rotationally coupled to the first end 64.1 of the first coupling shaft 64.

According to this embodiment, the propulsion assembly 40 comprises a third coupling system 78 that is configured to rotationally couple the second end 64.2' of the second coupling shaft 64' to the first end 64.1 of the first coupling shaft 64.

According to one configuration, the third coupling system 78 is substantially identical to the second coupling system 68. Thus, the first end 64.1 of the first coupling shaft 64 comprises a housing that is configured to at least partially receive the second end 64.2' of the second coupling shaft 64', the housing being cylindrical and provided with internal splines. In addition, the second end 64.2' of the second coupling shaft 64' comprises external splines that are configured to engage with the internal splines of the housing provided at the first end 64.1 of the first coupling shaft 64.

The propulsion assembly 40 may comprise more than two electric motors, the coupling shafts 64, 64' provided for the various electric motors 44, 44' being coupled to one another, one of the coupling shafts being coupled to a first input 52 of the transmission system 46.

The embodiment that can be seen in FIG. 6 makes it possible to install a plurality of electric motors 44, 44' in series and to increase the power of the propulsion assembly 40. As with the embodiment that can be seen in FIG. 5, it is not necessary to detach and remove the transmission system in order to carry out a maintenance operation on the first coupling system 66 of the electric motor 44.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly comprising:
a propulsion system,
electric motors, and
a transmission system that is configured to couple the electric motors to the propulsion system,
each electric motor comprising:
a first face oriented toward, and proximate to, the transmission system,
a second face facing away from the transmission system, and an output shaft,
the propulsion assembly comprising, for at least one electric motor:
a first coupling system that is configured to assume a coupled state in which the output shaft of the electric motor is rotationally coupled to the transmission system and an uncoupled state in which the output shaft of the electric motor is not coupled to the transmission system;
wherein the output shaft and the first coupling system are located at the second face of the electric motor, the output shaft having a free end that protrudes beyond the second face and is remote from the second face, the first coupling system being located within a portion of the output shaft projecting beyond the second face, in a vicinity of the free end of the output shaft, such that the first coupling system is located outside of the electric motor, and
wherein the propulsion assembly comprises at least one coupling shaft, which connects the output shaft of the electric motor to the transmission system, and has a first end that is configured to be rotationally coupled to the output shaft by way of the first coupling system and a second end that is rotationally coupled to the transmission system by way of a second coupling system.

2. The propulsion assembly as claimed in claim 1,
wherein the output shaft is hollow and extends from the first face to the second face, and
wherein the coupling shaft is housed in the hollow output shaft.

3. The propulsion assembly as claimed in claim 2, wherein the propulsion assembly comprises a cover located at the free end of the output shaft and connected to the output shaft by way of a removable connection.

4. The propulsion assembly as claimed in claim 1, wherein the propulsion assembly comprises a cover located at the free end of the output shaft and connected to the output shaft by way of a removable connection.

5. The propulsion assembly as claimed in claim 1, wherein the coupling shaft is hollow.

6. The propulsion assembly as claimed in claim 1,
wherein the transmission system comprises a hole housing the second end of the coupling shaft, and
wherein the second coupling system comprises external splines located at the second end of the coupling shaft and located beyond the first face and internal splines located in the hole and configured to engage with the external splines.

7. The propulsion assembly as claimed in claim 6, wherein the internal splines, which are secured to the transmission system, have increased durability relative to the external splines, which are secured to the coupling shaft.

8. The propulsion assembly as claimed in claim 1, wherein the propulsion assembly comprises, for each electric motor, a coupling shaft and first and second coupling systems.

9. An aircraft comprising at least one propulsion assembly as claimed in claim 1.

10. The propulsion assembly as claimed in claim 1, further comprising a first rolling bearing around the output shaft situated on the first face of each of the electric motors and a second rolling bearing around the output shaft situated on the second face of each of the electric motors.

11. The propulsion assembly as claimed in claim 10, further comprising a first roller bearing around the output shaft situated on the first face of each of the electric motors and a second roller bearing around the output shaft situated on the second face of each of the electric motors.

12. The propulsion assembly as claimed in claim 10, wherein the transmission system comprises a hole housing the second end of the coupling shaft, and wherein the second coupling system comprises external splines located at the second end of the coupling shaft and located beyond the first face and internal splines located in the hole and configured to engage with the external splines.

13. The propulsion assembly as claimed in claim 10, wherein the first coupling system further comprises first and second rotational guides located on either side of a ring having an internal surface that engages with the coupling shaft and an external surface that engages with the output shaft, such that at least one of the internal and external surfaces of the ring is frictionally coupled to the coupling shaft or the output shaft.

14. The propulsion assembly as claimed in claim 1, wherein the first coupling system further comprises first and second rotational guides located on either side of a ring having an internal surface that engages with the coupling shaft and an external surface that engages with the output shaft, such that at least one of the internal and external surfaces of the ring is frictionally coupled to the coupling shaft or the output shaft.

15. A propulsion assembly comprising:
a propulsion system,
electric motors, and
a transmission system that is configured to couple the electric motors to the propulsion system,
each electric motor comprising:

a first face oriented toward the transmission system,
a second face facing away from the transmission system, and
an output shaft,
the propulsion assembly comprising, for at least one electric motor:
a first coupling system that is configured to assume a coupled state in which the output shaft of the electric motor is rotationally coupled to the transmission system and an uncoupled state in which the output shaft of the electric motor is not coupled to the transmission system;

wherein the output shaft and the first coupling system are located at the second face of the electric motor, the output shaft having a free end that protrudes beyond the second face and is remote from the second face, the first coupling system being located within a portion of the output shaft projecting beyond the second face, in a vicinity of the free end of the output shaft, wherein the propulsion assembly comprises at least one coupling shaft, which connects the output shaft of the electric motor to the transmission system, and has a first end that is configured to be rotationally coupled to the output shaft by way of the first coupling system and a second end that is rotationally coupled to the transmission system by way of a second coupling system, wherein the output shaft is hollow and extends from the first face to the second face, and wherein the coupling shaft is housed in the hollow output shaft such that the coupling shaft extends beyond the first face and beyond the second face.

* * * * *